United States Patent [19]
Benson

[11] 3,919,474
[45] Nov. 11, 1975

[54] SYSTEM FOR TRANSFERRING MOTION PICTURE FILMS TO VIDEO RECORDINGS, AND FOR CHANGING ASPECT RATIOS

[75] Inventor: Kenneth Blair Benson, South Norwalk, Conn.

[73] Assignee: Goldmark Communications Corporation, Stamford, Conn.

[22] Filed: Jan. 18, 1974

[21] Appl. No.: 434,607

[52] U.S. Cl. .................................. 178/7.2; 355/52
[51] Int. Cl.² ........................................... H04N 5/30
[58] Field of Search ................... 178/7.2, 6.7 A, 6.8; 355/40, 45, 52; 353/50, 71; 350/171; 352/36, 79

[56] References Cited
UNITED STATES PATENTS

| | | | |
|---|---|---|---|
| 3,320,851 | 5/1967 | Fischer | 355/45 X |
| 3,442,586 | 5/1969 | Coil et al. | 355/45 X |
| 3,488,861 | 1/1970 | Jones et al. | 350/171 |
| 3,490,845 | 1/1970 | Gordon | 355/40 |
| 3,621,130 | 11/1971 | Habbal | 178/7.2 R |
| 3,796,828 | 3/1974 | Barboni et al. | 178/7.2 |
| 3,802,773 | 4/1974 | Schneider | 355/45 X |

OTHER PUBLICATIONS
Reitz, Jr., et al., "A Pan–Scan System for Printing Motion Pictures for Television from Anamorphic Negatives," Journal of the Smpte, Vol. 79, May, 1970, pp. 452–453.

*Primary Examiner*—Howard W. Britton
*Assistant Examiner*—Mitchell Saffian
*Attorney, Agent, or Firm*—St.Onge Mayers Steward & Reens

[57] ABSTRACT

An apparatus is described to automatically transfer a high aspect ratio motion picture film to a lower aspect ratio video recording according to predetermined film editing cue data. The film to video conversion is carried out on a real time basis by horizontally scanning the film projection relative to the optical input of a video camera. Cue data is placed in a magnetic storage from which the data is retrieved in sequence as a film frame count is compared with film length cue data in magnetic storage. The horizontal cue scanning is carried out during blanking of the projector when a new film frame is brought into its projecting position. A frame pulse indicative of this pull-down time period is produced to initiate the cue change at the appropriate predetermined film frame position.

15 Claims, 3 Drawing Figures

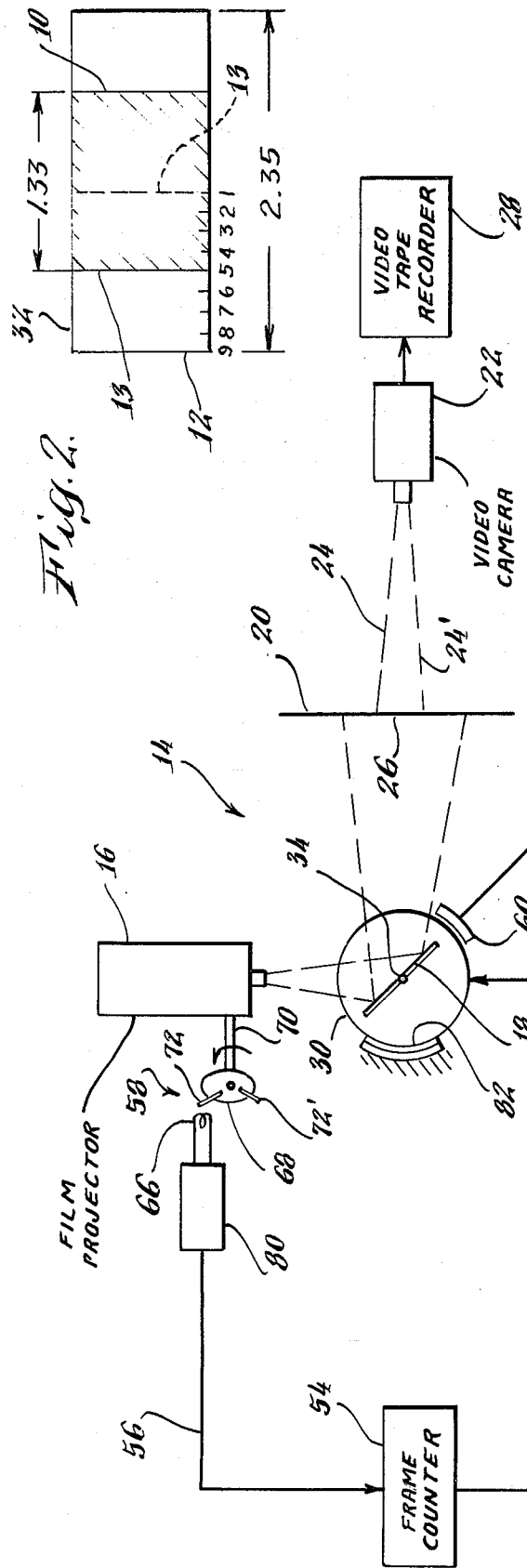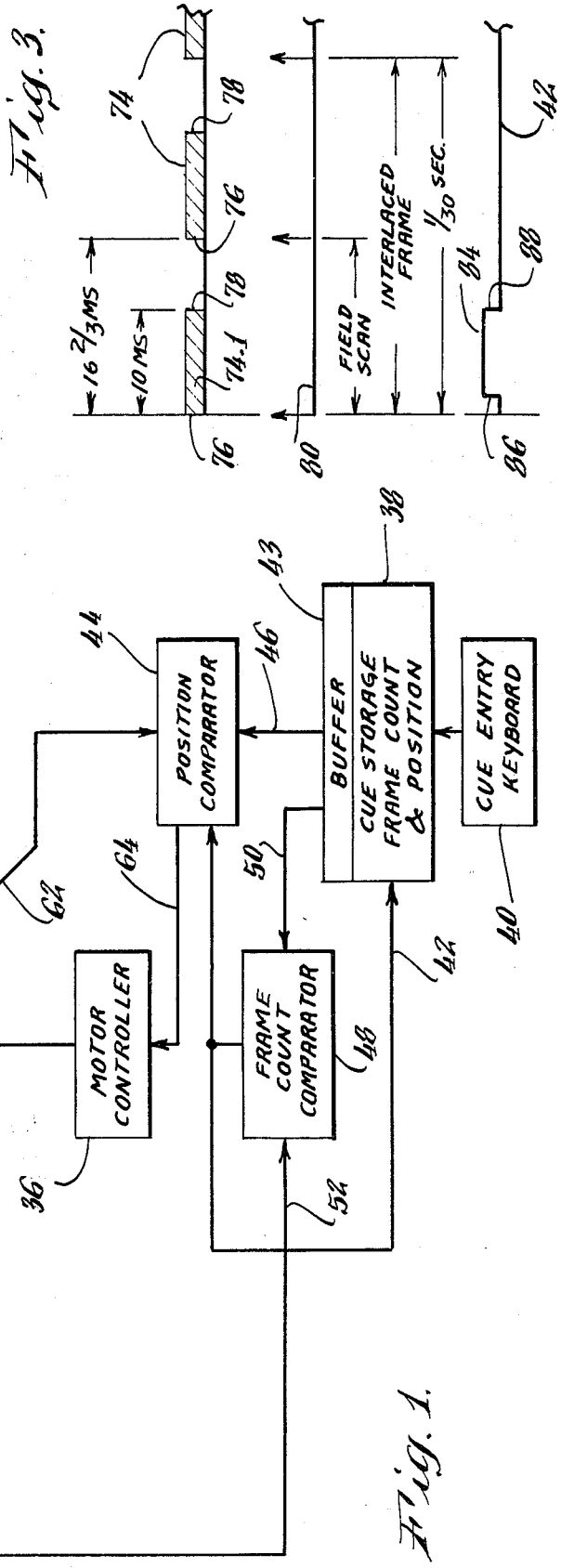

SYSTEM FOR TRANSFERRING MOTION PICTURE FILMS TO VIDEO RECORDINGS, AND FOR CHANGING ASPECT RATIOS

FIELD OF THE INVENTION

This invention relates to a system for transferring motion picture films to video recordings. More specifically, this invention relates to a rapid, real time operating system for transforming motion picture films having frames with a high aspect ratio into video recordings of a different aspect ratio.

BACKGROUND OF THE INVENTION

In the motion picture film industry, films are produced whose frame dimensions may vary considerably. For example, the two most commonly used projection aspect ratios (the width to height ratio of the projected film frame) of wide-screen motion picture films produced for theatrical release and presentation are 1.85 and 2.35. The 1.85 aspect ratio is obtained by reducing the height of the film frame while maintaining the same frame width. The 2.35 aspect ratio is used for anamorphic prints in accordance with American National Standards. The 2.35 aspect ratio is obtained by initially horizontally squeezing the image during recording with an anamorphic camera lens during the original photography. The lens has a two-two-one greater magnification vertically than horizontally. During projection, the image is expanded by means of a projector lens which is the inverse of the camera lens.

In the common home television receiver, the asepct ratio of the television raster is determined by FCC regulations to be four-to-three or 1.33. Consequently, cropping problems arise when video recordings for television are made of high aspect ratio motion picture films. For example, when a video camera is directed at a wide-screen motion picture film projection such as a 2.35 aspect ratio, a substantial amount of the action is lost by virture of the difference in aspect ratios between the film and the video frame.

In order to produce video recordings which include the essential action of the wide screen film, an editing approach is followed. In accordance with this, a film editor produces a cue listing by recording the appropriate relative location (cue position) of the desired video aperture with respect to the film projection during the film. When one follows these cues, the main action of the film may be recorded on the video tape and the lesser important film segments are cropped. The cue listing includes data of the film length for each cue so that the video recorder can be properly directed at the most appropriate position of the wide screen film.

The cue listing carries a standardized cue position data representative of predetermined positions of a video aperture relative to a wide film screen projection. These standardized cue positions enable others to follow the editing information to produce the proper video recording. These relative positions may vary in number with nine discrete cue positions for a high 2.35 aspect ratio film and five positions for a film with a 1.85 aspect ratio being satisfactory.

Several system have been proposed to transform motion picture film to video transformations. For example, as described in an article entitled "A Pan-Scan System for Printing Motion Pictures for Television from Anamorphic negatives" by L. P. Reitz et al., published in the Journal of the SMPTE, Vol. 79 of May, 1970 page 452, a system is described whereby the film editor's cue data is automatically applied to produce a film with frames of an aspect ratio of about 1.35 compatible for video recording. In a typical 35 mm. projection, the film is advanced through the projector at a speed of 90 feet per minute. In the aforementioned published system for transforming the wide screen film to a lower aspect ratio film, the printing speed is 40 feet per minute. Hence, this prior art system is limited in speed and requires the production of an intermediate film to achieve the desired film to video transformation.

Another system for producing the desired transformation from film to video tape was published in an article sponsored by the British Broadcasting Corporation. An article on the system was published by A. B. Palmer and A. P. Howden and entitled "Reproduction of Anamorphic Films" and presented to the Film '69 Conference held in London, England. In accordance with this BBC system, the film to video tape transformation is obtained by scanning the film projection with a flying spot scanner which is centered electrically at different segments of the projection.

SUMMARY OF THE INVENTION

In a system in accordance with the invention with which a video recording is formed from a wide screen film, the film is effectively projected directly onto a video aperture of a video camera. A video recording is made in real time according to cue instructions. Means are employed between the video camera and the film projector to produce relative horizontal positioning of the video aperture with respect to the wide film screen projection. The relative horizontal positions may be rapidly varied in a time period selected sufficiently small to enable cue position changes during the time that the film projector is blanked by the projector shutter. In this manner high speed film to tape transformations may be obtained on a real time basis in a convenient manner.

As described with respect to a preferred embodiment for a film to video recording transformer in accordance with the invention, the positioning means includes a mirror mounted to deflect the film projection relative to the optical aperture of a video camera. The mirror is rotated between cue positions with a motor controlled in its position with cue signals automatically read out from a magnetic storage. Control signals derived from the shutter on the motion picture projector are employed to enable the reposoitioning of the mirror during the time when a new film frame is being pulled down in front of the projector.

It is, therefore, an object of the invention to provide a system for rapid automatic formation of a video recording of a motion picture film of a different aspect ratio.

BRIEF DESCRIPTION OF DRAWINGS

These and other advantages and objects of the film to video conversion system in accordance with the invention may be understood from the following detailed description of a preferred embodiment described in conjunction with the drawings wherein FIG. 1 is a schematic representation of a film to video conversion system in conjunction with the drawings wherein FIG. 2 is a schematic representation of a video aspect ratio relative to a motion picture film aspect ratio;

FIG. 3 is a partial timing diagram for the system shown in FIG. 1.

DETAILED DESCRIPTION OF EMBODIMENT

With reference to the Figures, FIG. 2 shows a video frame 10 superimposed over a wide screen frame 12 of an aspect ratio of 2.35. The video frame 10 may be moved relative to the film frame 12 with nine discrete cue positions labeled as such from right to left. The cue positions are standardized so that others may reproduce cue instructions generated by a film editor. The number of cue positions may vary as appears appropriate for the desired film to tape conversion. In the view of FIG. 2 the video frame 10 is shown in the center, number five cue position. The first cue position placing the left edge 13 of video frame 10 as shown opposite numeral 1. The full cue information includes a cue position number from one through nine and a film footage and frame number. The cue information is recorded on a magnetic tape for storage and subsequent use in producing a video recording.

In FIG. 1 a film to video conversion system 14 is shown. A film projector 16 projects the film frames via the reflection from a horizontal scanning mirror 18 onto a rear projection screen 20. Projector 16 is provided with suitable optics for projecting films such as the wide screen high aspect ratio (2.35) anamorphic film. In back of screen 20 is a video camera 22 whose optical aperture as suggested by lines 24–24' is genrally focused on a small segment 26 of screen 20. The video camera 22 is connected to a video tape recorder 28 which provides a video tape recording of the projection incident on segment 26. The movable mirror 18 may be rotated to nine different rotational positions by a stepping motor 30.

The view of screen 20 is along the side dimension 32 (see FIG. 2) of the film projection 12 and the mirror 18 has an axis of rotation 34 which is perpendicular to the plane of the drawing in FIG. 1. In this manner, different rotational positions of mirror 18 can cause its projection onto screen 20 to be moved relative to the optical aperture of video camera 22. The relative motions of the projection from mirror 18 are controlled in accordance with cue signals applied to stepping motor 30 from a motor controller 36. Note that the rear projection screen can be replaced with a field lens.

The cue data established by the film editor are entered into a digital magnetic storage device 38 by either a cue entry keyboard 40 or with a paper tape-reader (not shown). The stored cue data includes film length data representative of the number of feet and frames from the head of the film and the appropriate cue position number to be effective for the film segment following this film length. The data is stored magnetically, with conventional input devices and error checking. The data is organized on the magnetic storage so that in response to an input pulse applied to line 42, the next equential cue data is read out from magnetic storage and placed in a buffer store 43. The read-out cue data from the buffer store 43 is separated with positional cue information being applied to a digital position comparator 44 along output line 46 and with film length data being applied to a frame count comparator 48 along output line 50.

The frame count comparator 48 receives an actual film length input signal (representative of the distance from the head of the film) on input 52. This film length signal is obtained from a frame counter 54 driven by frame pulses on an input line 56 and derived from a frame passage sensing device 58. Frame count comparator 48 may be digital to compare with actual frame count on line 52 with the frame count presented on line 50 from the buffer in storage device 38. When a comparison of the frame counts establishes a coincidence, an output frame coincidence pulse is produced on output line 42.

The frame conincidence coincidence on line 42 is applied to position comparator 40 to enable the latter to receive the cue position data presented on line 46 from cue storage 38 and implement the cue position change called for. The frame coincidence pulse is further applied to the cue storage device 38 to cause the latter to advance to the next cue data for its placement in the buffer storage.

Cue position control is obtained with a mirror position sensor 60, which detects which of the nine (or five as the case may be) discrete cue positions mirror 18 may be in. The sensor 60 may be optical or magnetic and produces an output signal on line 62 suitable for comparison with the cue position data on line 46 from cue storage device 38.

The cue position comparison produces an output error signal on line 64 representative of the difference between the actual mirror position and the one to which it is to be moved. The cue error signal on line 64 may have a polarity indicative of the direction of rotation of stepping motor 30 and a magnitude representative of which position mirror 18 is to be moved to.

Alternatively, the feedback control over the position of mirror 18 may be replaced with a direct open loop control with which the stepping motor 30 is advanced to the position called for by the data on line 46. In such case, comparator 44 is deleted and a direct coupling of line 46 to motor controller 36 is provided. The direct drive would be enabled during the time period determined by the pulse on line 42 to assure that mirror 18 is only moved during projector blanking and when a cue position change is required as sensed by the coincidence frame comparison from comparator 48. A suitable light and light sensor may then be used to automatically position mirror 18 at a start or zero position at the start of a film to video transfer.

In order to avoid horizontal smearing of the television picture during horizontal repositioning of mirror 18 and thus the film frame relative to the optical input of video camera 22, it is essential that mirror movement occurs during the period when the next film frame is pulled down and when the film projection is blanked by a rotating shutter. During frame pull down, the projector light is blanked by a rotating shrutter (not shown) common with 35 mm. projectors. The start of the shutter blanking period is sensed with frame pull-down sensor 58.

A proximity detector 66 is mounted adjacent to a disc 68 attached to a shaft 70 rotated by the film frame pull-down mechanism (not shown) inside projector 16. A pair of metallic tabs 72, 72' are placed on the outer edge of disc 68 at angular locations selected to signify respectively the beginning and completion of the projector blanking and film frame pull-down cycle. By adjustment of the angular position of the proximity detector 66, a precise phasing of the frame pull-down signal on line 56 with the shutter blanking can be obtained.

The frame signal on line 56 is in the form of a single pulse 74 (see FIG. 3) whose leading edge 76 signifies the start of shutter blanking aand whose trailing edge 78 indicates the end of shutter blanking. Such single pulse may be conveniently produced with a flip-flop counter 80 responsive to the pulses generated by the passage of tabs 72–72'. Tabs 72 may be located at different radial positions of disc 68 and thus be detected with a pair of correspondingly radially separated proximity detectors 66. In this manner the commencement and termination of frame pull-down can be reliably sensed.

The film projector operates at a speed whereby a new frame is pulled down every 16⅔ milliseconds. The pull-down takes approximately ten milliseconds so that the balance of the time period is used for projection. Accordingly, ten milliseconds are available to reposition mirror 18 if real-time film to video conversion is to be provided.

As can be seen from FIG. 3 on timing line 80, the television raster scanning occurs on a comparable time basis with 1/30 second for each full video frame. In practice, the television scanning and projector intermittent motion are not completely synchronous, since the color television field rate is 59.94 Hz and the projector 16 is driven by a synchronous motor locked to the sixty cycle power line. In view of the storage capability in the video camera pick-up tube, an even exposure is maintained.

Since the repositioning or cue changes for the mirror 18 occurs during the 10 millisecond interval, a high power motor drive 36 is used. The stepping motor 30, as a result, tends to oscillate for a time period extending several milliseconds after completion of the frame pull-down movement. Such extended motor or mirror movements produce objectionable small horizontal motions in the optical input of video camera 22. These oscillations are eliminated by the addition of frictional damping as suggested by the frictional element 82 shown in contact with the stepping motor 30. The friction is selected sufficiently low to maintain an adequate torque for a rapid change of mirror position. On the other hand, the friction is sufficiently great to dampen the motor oscillations when power is no longer applied from motor controller 36.

In the operation of the film to video transfer apparatus 14, assume that cue data has been stored in the magnetic storage device 38 by either entry through keyboard 40 or with a paper tape reader or the like. The film to be transferred to a video form is threaded in the film projector 16 and a start-marked frame located in the film gate (not shown) in projector 16. Upon start of the projector, the rotation of shaft 70 causes a pulse 74 to be applied to the frame counter 54. Counter 54 accumulates pulses 74 to produce a film length count which is compatible with the film length data in tape store 38. Counter 74, in such case, may convert the frame pulse 74 into feet plus frame numbers when this is the form for the film length data in storage 38.

The magnetic data in storage 38 is organized in such manner that the first film length data corresponds with the first frame pulse 74 and thus the first associated cue mirror position data is applied to comparator 44. Hence, when the apparatus 14 is started and the proximity sensor 66 produces the first frame pulse 74.1, a coincidence is sensed by comparator 48 and an enabling pulse 84 (see FIG. 3) appears on line 42. The leading edge 86 of pulse 84 places the first cue position in comparator 44 and enables the mirror to be driven to the cue position called for. The trailing edge 88 of pulse 84 is sensed in storage device 38 and is effective to initiate an advance whereby the next cue data is retrieved from magnetic storage and placed in the buffer storage. The motor controller operates on the cue position data to quickly rotate mirror 18 to the called-for cue position after which the enabling pulse 84, of the order of less than 10 millisecond terminates and the mirror retains its new cue position.

When the next frame length coincidence is sensed by comparator 48, the above procedure is repeated. The entire film to video conversion may in this manner be continued and completed automatically and in real-time.

Having thus described a system for converting a motion picture film to a video recording in accordance with the invention, its advantages can be appreciated. The conversion can be completed in real time as a result of the rapid cue position changes with a relatively low mass mirror. The apparatus maintains high resolution conversion with quality registration of multiple color film projections. The use of magnetic cue data storage facillitates the insertion of changes as these appear desirable.

What is claimed is:

1. A system for generating a video recording of a motion picture film having a different greater aspect ratio from that of the video recording comprising means including a video camera having an optical aperture for producing a video recording with a video aspect ratio;

a motion picture film projector to produce a film projection of a film with said different greater aspect ratio from the video recording and oriented to direct the film projection onto the optical aperture of the video camera, said film projection being blanked during a film frame pull-down cycle;

optical beam bending means for angularly changing the position of the film projection relative to the video optical aperture to enable said video recording of desired segments of the film projection; said optical beam bending means having a mass which is selected sufficiently low to enable repositioning thereof during a film frame pull-down cycle;

means producing cue position signals representative of the desired position of the video optical aperture relative to the film projection and cue frame length signals indicative of the film segments during which the cue position signals are to be effective; and means controlled by the cue frame signals and operative during the frame pull-down cycle of the film projector for applying the cue position signals to the positioning means for establishing a relative position between the film projection and the optical video aperture in accordance with the applied cue position signal whereby a direct video recording of a motion picture film is obtained.

2. The system for generating a video recording as claimed in claim 1 wherein the means for applying the cue position signals further includes means associated with the film projector for generating frame pulses representative of the pull-down cycle of the film frame, said frame pulses being coupled to initiate the application of the cue position signals at the desired film frame lengths.

3. The system for generating a video recording as claimed in claim 2 wherein the applying means further includes means for accumulating frame pulses and producing a frame length count indicative of the film length being projected; and means for comparing the frame length count with a cue frame length signal to produce a cue enable signal when the cue position signal associated with the cue frame length signal is to be applied to the horizontal positioning means.

4. The system for generating a video recording as claimed in claim 1 and further including a rear projection screen located to receive the projection on one side thereof and expose the optical aperture of the video camera on the other side of the screen.

5. The system for generating a video recording as claimed in claim 4 wherein the reflective horizontal positioning means includes a mirror mounted for rotation along an axis oriented to enable said horizontal positioning; and means for rotating the mirror to cue position signal determined positions.

6. A system used for producing a video recording of a motion picture film having a different aspect ratio with cue data comprising means including a video camera having an optical input aperture for producing a video recording with a video aspect ratio;

a motion picture film projector for producing a projection of a film having a different aspect ratio from that of the video recording, said motion picture film projection being effectively directed at the optical aperture of the video camera for producing a video recording of the motion picture film;

means associated with the film projector for producing frame pulses representative of the projector blanking time periods during the film projection;

means for enabling different relative positions between the optical input of the video camera and the projection of the film frames to expose the optical input of the video camera to desired segments of the motion picture film;

means for producing cue data representative of the desired positions of the optical input aperture of the video camera relative to the motion picture film projection for preselected film lengths;

means for storing the cue data;

means responsive to the frame pulses for retrieving from the storing means predetermined cue data operative during the preselected film lengths; and means operative during a frame pulse for controlling the relative positioning means to expose the optical aperture of the video camera to a desired segment of the motion picture film projection in accordance with the retrieved cue data.

7. The system for producing video recordings as claimed in claim 6 wherein the retrieving means further includes means responsive to the frame pulses for producing an actual film length signal representative of the actual length of the film which has been projected;

means for comparing the actual film length signal with a predetermined film length signal located in the storing means and associated with a stored cue position signal and producing a cue enabling signal upon coincidence between said film length signals; and wherein the controlling means includes means responsive to the cue enabling signal for applying the retrieved cue position signal to the different relative position enabling means to expose the optical input of the video camera to the desired segment of the motion picture film as determined by the retrieved cue data.

8. The system for producing video recordings as claimed in claim 6 wherein the means for enabling different relative positions between the optical input of the video camera and the projection of the film frames include a mirror mounted for rotation and located to reflect the projected film onto the optical aperture of the video camera; and means for rotating the mirror to discrete retrieved cue position data determined positions.

9. The system for producing video recordings as claimed in claim 8 and further including a rear projection screen operatively located between the mirror and the optical aperture of the video camera.

10. The system for producing video recordings as claimed in claim 6 wherein the frame pulse producing means further includes a rotating element driven in synchronous relationship with the film projector, and means associated with the rotated element for generating said frame pulses representative of the blanking time of the film projector.

11.

12. The system for producing video recordings as claimed in claim 11 wherein the rotating element is provided with metallic tabs angularly located in correspondence with the film projector blanking; and a proximity detector mounted adjacent the rotating element to sense passage of the metallic tabs and produce an output signal representative of said frame pulses.

13. In a system for generating a video recording of a motion picture film projection being projected with a film projector with an aspect ratio which is greater than the video recording aspect ratio, the film projection being blanked during a film frame pull-down cycle, with the video recording being made in accordance with the film editor produced cue information formed of cue position data and cue film length data, the improvement comprising a video camera having an optical input;

a rotatable scanning element located to enable positioning of a motion picture film projection relative to the optical aperture of the video camera; said rotatable scanning element having a mass which is selected sufficiently low to enable repositioning thereof during a film frame pull-down cycle;

means producing a frame signal during the time of blanking of the film projection; and means actuated by the frame signal for locating the rotatable scanning element during the film frame pull-down cycle in accordance with the cue position data at corresponding film lengths determined by the cue film length data.

14. The improvement for generating a video recording as claimed in claim 13 wherein the low mass reflective scanning element is formed of a mirror mounted for rotation along an axis oriented to enable said horizontal positioning.

15. The improvement as claimed in claim 14 and further including a dampening element coupled to the mirror to enable the mirror to be rotated to a new cue position during the blanking of the film projection without extended oscillations.

\* \* \* \* \*

UNITED STATES PATENT OFFICE
CERTIFICATE OF CORRECTION

PATENT NO. : 3,919,474
DATED : November 11, 1975
INVENTOR(S) : Kenneth Blair Benson It is certified that error appears in the above-identified patent and that said Letters Patent are hereby corrected as shown below:

Column 1, line 28, "two-two-one" should be --two-to-one--.
Column 2, line 50, "reposoitioning" should be --repositioning--.
Column 3, line 29, "genrally" should be --generally--;
Column 3, line 58, "equential" should be --sequential--.
Column 4, line 9, delete "conincidence";
Column 4, line 9, after "coincidence" insert --pulse--.
Column 5, line 54, "74" should be --54--.
Column 7, line 9, after "the" insert --film--.
Column 8, line 27, "11" should be --10--.

Signed and Sealed this ninth Day of March 1976

[SEAL]

Attest:

RUTH C. MASON
Attesting Officer

C. MARSHALL DANN
Commissioner of Patents and Trademarks